(12) United States Patent
Kim et al.

(10) Patent No.: US 11,586,873 B2
(45) Date of Patent: *Feb. 21, 2023

(54) MODE-CHANGEABLE POWER SUPPLY CIRCUIT AND SMART CARD INCLUDING THE SAME

(71) Applicant: SAMSUNG ELECTRONICS CO., LTD., Suwon-si (KR)

(72) Inventors: Kyeongdo Kim, Seoul (KR); Sanghyo Lee, Incheon (KR); Seungwon Lee, Yongin-si (KR); Jongpil Cho, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/366,908

(22) Filed: Jul. 2, 2021

(65) Prior Publication Data

US 2021/0334618 A1    Oct. 28, 2021

Related U.S. Application Data

(63) Continuation of application No. 16/233,886, filed on Dec. 27, 2018, now Pat. No. 11,055,598.

(30) Foreign Application Priority Data

Jan. 9, 2018   (KR) .................... 10-2018-0002883

(51) Int. Cl.
*G06K 19/077* (2006.01)
*G06K 19/07* (2006.01)
(Continued)

(52) U.S. Cl.
CPC ... *G06K 19/07773* (2013.01); *G06K 19/0715* (2013.01); *H02M 1/08* (2013.01);
(Continued)

(58) Field of Classification Search
CPC ......... G06K 19/07773; G06K 19/0715; G06K 19/0707; G06K 19/077; H02M 1/08;
(Continued)

(56) References Cited

U.S. PATENT DOCUMENTS 4,725,839 A * 2/1988 Crowe .................... H04B 3/54
340/870.31
6,218,819 B1   4/2001 Tiwari
(Continued)

*Primary Examiner* — Sonji N Johnson
(74) *Attorney, Agent, or Firm* — Lee IP Law, P.C.

(57) ABSTRACT

A smart card includes an antenna to transmit and to receive a radio frequency signal, a rectifier to rectify a signal received through the antenna to output a rectified voltage, a voltage regulator to operate in a first operation mode for stabilizing a level of the rectified voltage and a second operation mode for generating an internal voltage using the rectified voltage, a regulator converter to control the voltage regulator to operate the voltage regulator in one of the first operation and the second operation according to a mode selection signal, a clamp circuit to connect an output terminal of the rectifier to a ground according to the mode selection signal, a load modulator to vary a resistance of the antenna to perform a load modulation, and a regulator controller to generate the mode selection signal according to whether the load modulator is activated or deactivated.

20 Claims, 14 Drawing Sheets

(51) Int. Cl.
*H02M 1/08* (2006.01)
*H02M 3/156* (2006.01)
*H02M 7/06* (2006.01)
*H02M 1/00* (2006.01)

(52) U.S. Cl.
CPC .......... *H02M 1/0045* (2021.05); *H02M 3/156* (2013.01); *H02M 7/06* (2013.01)

(58) Field of Classification Search
CPC ...... H02M 1/0045; H02M 3/156; H02M 7/06; H02J 50/20; H02J 50/02
See application file for complete search history.

(56) References Cited

U.S. PATENT DOCUMENTS

| | | |
|---|---|---|
| 6,970,690 B2 | 11/2005 | Yajima et al. |
| 7,705,712 B2 | 4/2010 | Kelly et al. |
| 8,611,119 B2 | 12/2013 | Bates |
| 8,971,804 B2 | 3/2015 | Butler |
| 9,218,518 B2 | 12/2015 | Kim et al. |
| 2003/0222632 A1 | 12/2003 | Weder |
| 2007/0246546 A1 | 10/2007 | Yoshida |
| 2007/0249398 A1* | 10/2007 | Watanabe ............ G06K 7/0008 455/333 |
| 2010/0103707 A1* | 4/2010 | Bates .................. G06K 19/0701 363/73 |
| 2010/0136911 A1* | 6/2010 | Sekita .................. H01Q 1/2208 455/41.2 |
| 2013/0223116 A1 | 8/2013 | Cho et al. |
| 2013/0235910 A1* | 9/2013 | Washiro ................. H04B 3/542 375/295 |
| 2013/0337744 A1 | 12/2013 | Lefley |
| 2013/0337756 A1 | 12/2013 | Wilson |
| 2015/0162754 A1 | 6/2015 | Nakano et al. |
| 2017/0046609 A1 | 2/2017 | Narendra et al. |

* cited by examiner

MODE-CHANGEABLE POWER SUPPLY CIRCUIT AND SMART CARD INCLUDING THE SAME

CROSS-REFERENCE TO RELATED APPLICATIONS

This is a continuation application based on pending application Ser. No. 16/233,886, filed on Dec. 27, 2018, the entire contents of which is hereby incorporated by reference.

Korean Patent Application No. 10-2018-0002883, filed on Jan. 9, 2018, in the Korean Intellectual Property Office, and entitled: "Mode-Changeable Power Supply Circuit and Smart Card Including the Same," is incorporated by reference herein in its entirety.

BACKGROUND

1. Field

Embodiments relate to a semiconductor device, more particularly, to a mode-changeable power supply circuit and a smart card including the mode-changeable power supply circuit.

2. Description of the Related Art

A smart card, also referred to as a chip card or an integrated circuit (IC) card, is classified as a contact card, a contactless card, and a combi card according to their power supply interfaces. The contact card receives an external power through a contactless power supply interface, e.g., through an electrical contact of a contact terminal on a surface of the contact card. The contactless card receives an external power through a contact power supply interface, e.g., through a radio frequency signal received by a non-contact terminal, e.g., an antenna, of the contactless card. The combi card receives an external power through both the contactless power supply interface and the contact power supply interface.

A contactless card system, e.g., a smart card system, includes a card reader that communicates with a nearby smart card through a radio frequency signal. The card reader and the nearby smart card exchange information with each other through a non-contact type information recognition technology.

The smart card converts an electromagnetic wave radiated from the card reader into a voltage signal through electromagnetic induction. A voltage regulator is a power supply circuit of the smart card and stabilizes the voltage signal induced from the electromagnetic wave. However, when the voltage regulator operates to stabilize the voltage signal, a communication between the card reader and the smart card becomes unstable due to the operation of the voltage regulator. A technology for solving the instability in the communication between the card reader and the smart card, is desirable for a reliability of the smart card.

SUMMARY

Embodiments are directed to a smart card including an antenna to transmit and to receive a radio frequency signal, a rectifier to rectify a signal received through the antenna to output a rectified voltage, a voltage regulator to operate in a first operation mode for stabilizing a level of the rectified voltage and a second operation mode for generating an internal voltage using the rectified voltage, and a regulator converter to control the voltage regulator to operate the voltage regulator in one of the first operation mode and the second operation mode according to a mode selection signal, a clamp circuit to connect an output terminal of the rectifier to a ground according to the mode selection signal, a load modulator to vary a resistance of the antenna to perform a load modulation; and a regulator controller to generate the mode selection signal according to whether the load modulator is activated or deactivated.

Embodiments are directed to a power supply circuit of a smart card. The power supply circuit includes a rectifier to rectify an AC voltage received from an antenna and to output the rectified AC voltage, a voltage regulator to operate in a low dropout (LDO) mode and to generate an internal voltage using the rectified AC voltage when a load modulation for varying a resistance of the antenna is activated, and to operate in a regulator mode to maintain a level of the rectified AC voltage to be constant when the load modulation is deactivated, and a clamp circuit to connect an output terminal of the rectifier to a ground when the load modulation is activated.

Embodiments are directed to a power supply circuit of an integrated circuit card. The power supply circuit includes a rectifier to generate a first rectified voltage by rectifying an AC voltage, a voltage regulator to generate an internal output voltage in first and second operation modes, and a clamp circuit to discharge the first rectified voltage in the first operation mode to generate a second rectified voltage having a lower voltage than the first rectified voltage. In the first operation mode, the voltage regulator generates the internal output voltage using the second rectified voltage as a power supply voltage, and in the second operation mode, the voltage regulator generates the internal output voltage using the first rectified voltage as the internal output voltage.

BRIEF DESCRIPTION OF THE DRAWINGS

Features will become apparent to those of skill in the art by describing in detail exemplary embodiments with reference to the attached drawings in which.

DETAILED DESCRIPTION

Below, embodiments will be described clearly and in detail with reference to accompanying drawings.

Figure 1:
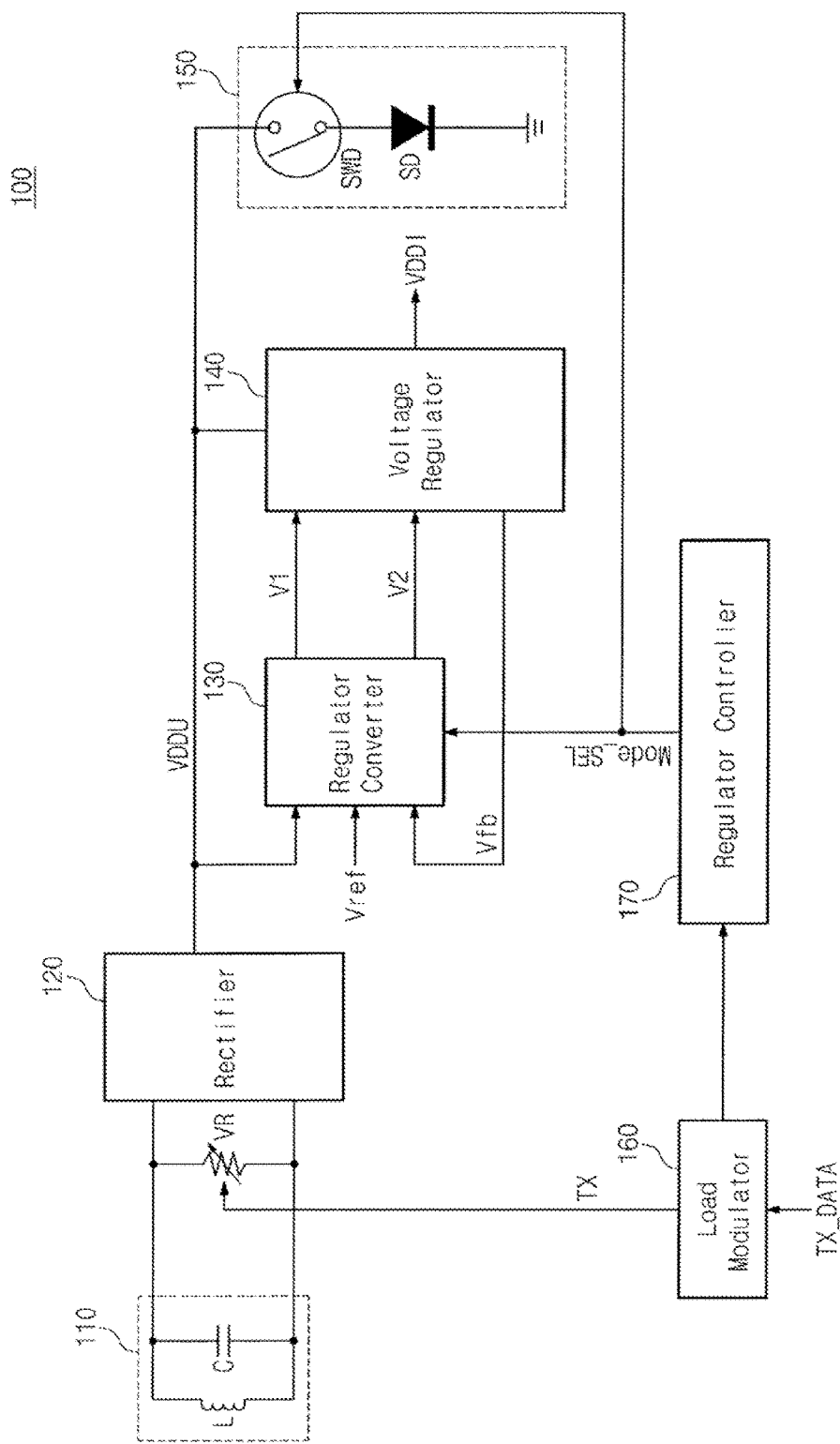
FIG. 1 illustrates a block diagram of a smart card according to an exemplary embodiment.

FIG. 1 is a block diagram of a smart card according to an embodiment.

Referring to FIG. 1, the smart card 100 may include an antenna 110, a rectifier 120, a regulator converter 130, a voltage regulator 140, a clamp circuit 150, a load modulator 160, and a regulator controller 170.

The antenna 110 may transmit or receive a radio frequency signal to communicate with a card reader (not shown). In an exemplary embodiment, the antenna 110 may have an inductor L and a capacitor C connected to each other in parallel. The antenna 110 may convert the radio frequency signal transmitted from the card reader into an electrical signal through electromagnetic induction of the inductor L and the capacitor C. The antenna 110 may have a loop antenna structure to communicate with the card reader. For example, the antenna 110 may have a dual resonance loop structure for a high electromagnetic efficiency.

The rectifier 120 may rectify an alternating current (AC) signal received from the antenna 110 and may output the rectified AC signal as a rectified voltage VDDU. For example, the rectifier 120 may include rectifier circuits, e.g., a half-wave rectifier circuit and a full-wave rectifier circuit. Additionally, the rectifier 120 may include a smoothing circuit to smooth the rectified AC voltage. In an exemplary embodiment, the rectifier 120 may be the full-wave rectifier circuit including bridge-coupled four diodes.

The regulator converter 130 may control an operation mode of the voltage regulator 140 such that the voltage regulator 140 may operate in one of a first regulator mode and a second regulator mode according to a mode selection signal Mode_SEL. The mode selection signal Mode_SEL may vary according to whether a load modulation is activated or deactivated. In the first regulator mode, the rectified voltage VDDU may maintain a constant voltage. In the second regulator mode, the voltage regulator 140 may generate a stabilized internal voltage VDDI regardless of a level change of the rectified voltage VDDU. For example, the second regulator mode may be for preventing or minimizing a noise, which may be caused by an operation of a voltage regulator during a load modulation, through operating the voltage regulator 140 in a low dropout (LDO) mode.

The regulator converter 130 may select a divided voltage of the rectified voltage VDDU, a reference voltage Vref, and a feedback voltage Vfb according to the mode selection signal Mode_SEL and may provide the selected voltages to a negative input terminal (−) and a positive input terminal (+) of the voltage regulator 140. The regulator converter 130 may select one of the divided voltage of the rectified voltage VDDU and the reference voltage Vref and may provide the selected one as a first voltage V1 to the negative input terminal (−) of the voltage regulator 140. The regulator converter 130 may select one of the reference voltage Vref and the feedback voltage Vfb and provides the selected one as a second voltage V2 to the positive input terminal (+) of the voltage regulator 140.

The voltage regulator 140 may operate in one mode of the first and second regulator modes of the regulator converter 130. In the first regulator mode, the voltage regulator 140 may detect a level change of the rectified voltage VDDU and may perform a regulating operation to maintain the rectified voltage VDDU at a target level. In the second regulator mode, the voltage regulator 140 may operate in the LDO mode and may maintain the internal voltage VDDI to be constant regardless of the level change of the rectified voltage VDDU that is caused by the load modulation. For example, in the second regulator mode, the voltage regulator 140 may operate in the LDO mode to suppress a distortion or a noise of a transmission signal generated by the load modulation. For example, the stabilized internal voltage VDDI may be generated and an error of the transmission signal may be reduced by changing the operation mode of the voltage regulator 140.

The clamp circuit 150 may be connected between an output terminal of the rectifier 120 for outputting the rectified voltage VDDU and a ground and may operate according to the mode selection signal Mode_SEL. For example, the clamp circuit 150 may flow a discharge current from the output terminal of the rectifier 120 to the ground when the load modulation is activated. For example, the clamp circuit 150 may flow the discharge current from the output terminal of the rectifier 120 to the ground when the voltage regulator 140 operates in the second regulator mode. The clamp circuit 150 may include a diode switch SWD and a diode SD. The diode switch SWD may include a first terminal connected to the output terminal of the rectifier 120 and a second terminal connected to diode SD. The clamp circuit 150 may not flow the discharge current from the output terminal of the rectifier 120 to the ground when the voltage regulator 140 operates in the first regulator mode, i.e., when the load modulation is deactivated.

The load modulator 160 may generate a transmission signal TX according to a transmission data TX_DATA provided from a data generator (not shown) of the smart card 100 and may control a variable resistor VR connected to both ends of the antenna 110 according to the transmission signal TX. Additionally, the load modulator 160 may provide the regulator controller 170 with the transmission signal TX or information indicating whether the load modulation is activated or deactivated.

The regulator controller 170 may generate the mode selection signal Mode_SEL according to the transmission signal TX provided from the load modulator 160 or according to the information indicating whether the load modulation is activated or deactivated. For example, when the load modulation is deactivated, the regulator controller 170 may output the mode selection signal Mode_SEL having a low level so that the voltage regulator 140 and the clamp circuit 150 may operate in the first regulator mode. On the other hand, when the load modulation is activated or a transition of the transmission signal TX is detected, the regulator controller 170 may output the mode selection signal Mode_SEL having a high level so that the voltage regulator 140 and the clamp circuit 150 may operate in the second regulator mode. Here, the regulator controller 170 may detect the transmission signal TX to determine whether the load modulation is activated or deactivated. For example, the regulator controller 170 may receive any flag signal or data to determine whether the load modulation is activated or deactivated.

In the above, configurations for the regulator and the load modulation of the smart card 100 according to an embodiment have been described. The smart card 100 may change the operation mode of the voltage regulator 140 to reduce the noise caused by the load modulation and by the operation of the voltage regulator 140 in a transmission mode. Additionally, the clamp circuit 150 for flowing the discharge current from the output terminal of the rectifier 120 to the ground is activated to adjust an amount of current flowing to the ground through the voltage regulator 140. According to these configurations, a load modulation waveform is generated by the load modulation, and a distortion and a noise of the load modulation waveform, which is caused by the operation of the voltage regulator 140 and the load modulation, may be reduced by the mode change of the voltage regulator 140 when the load modulation is performed, and as a result, an error of the transmission signal TX may be reduced in the transmission mode.

Figure 2:
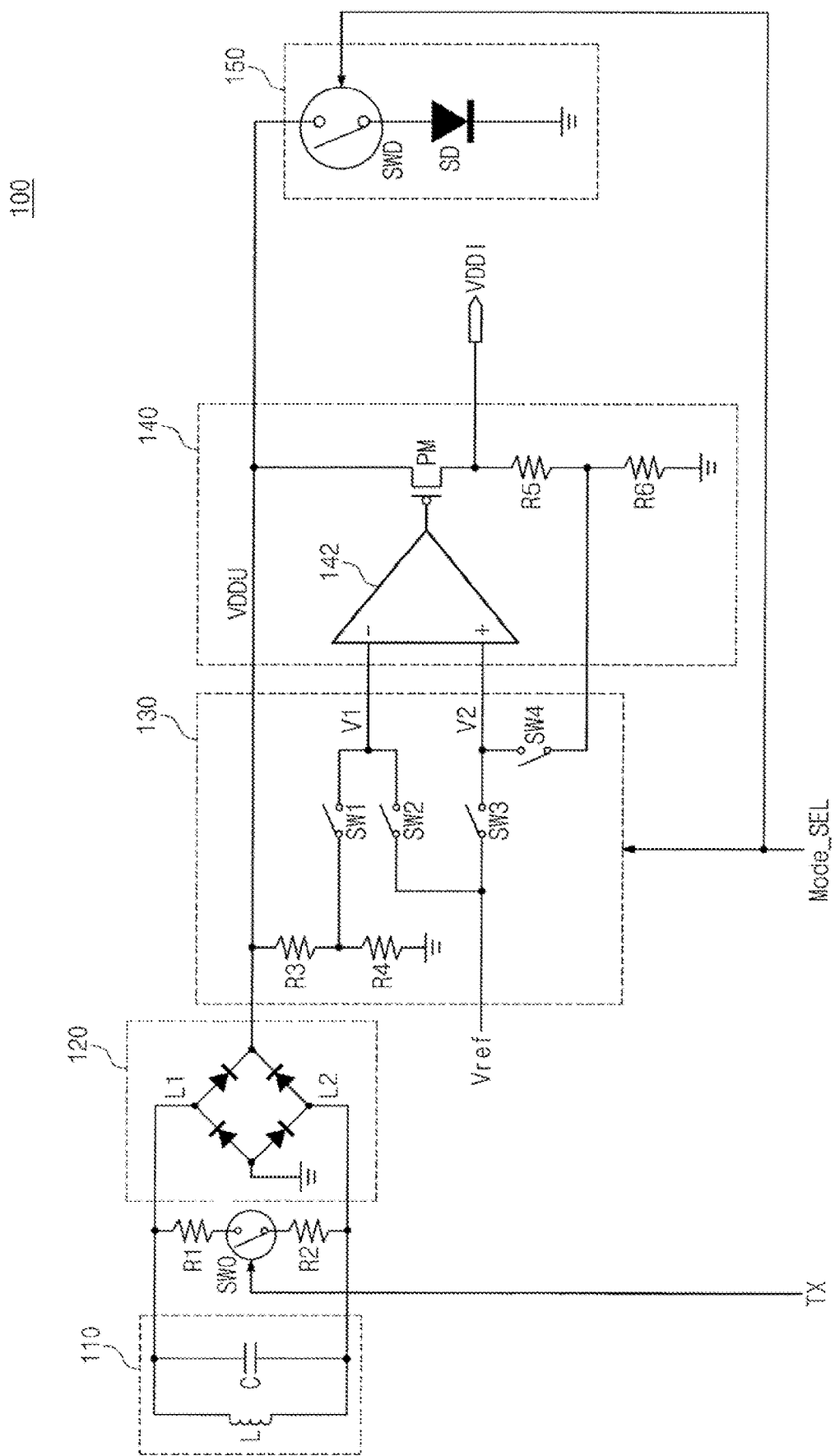
FIG. 2 illustrates a circuit diagram of a power supply circuit of the smart card of FIG. 1.

FIG. 2 is an example of a circuit diagram of a power supply circuit of the smart card of FIG. 1. Referring to FIG. 2, the power supply circuit of the smart card 100 may include the antenna 110, the rectifier 120, the regulator converter 130, the voltage regulator 140, and the clamp circuit 150. Since configurations of the antenna 110 and the clamp circuit 150 of FIG. 2 are the same as those of the antenna 110 and the clamp circuit 150 of FIG. 1, detailed descriptions thereof will be omitted.

The variable resistor VR may include a first resistor R1, a second resistor R2, and a modulation switch SW0. For example, the first resistor R1, the modulation switch SW0, and second resister R2 may be connected in series, and the first and second resistors R1 and R2 are connected to the both ends of the antenna 110, respectively. The modulation switch SW0 may be turned-on or turned-off by the transmission signal TX. According to the on/off operation of the modulation switch SW controlled by the transmission signal TX, a load between the both ends of the antenna 110 may be changed, and levels of electrical signals induced at the both ends of the antenna 110 or both ends L1 and L2 of the rectifier 120 may be changed.

As an example, the rectifier 120 may be configured as a full-wave rectifier circuit including four diodes connected in a closed loop bridge. An AC signal input the both ends L1 and L2 of the rectifier 120 may be full-wave rectified, and the rectified AC signal may be output as the rectified voltage VDDU.

The regulator converter 130 may include at least four switches SW1, SW2, SW3, and SW4 that are turned-on/off in response to the mode selection signal Mode_SEL. The voltage regulator 140 may include a comparator 142 having a negative input terminal (−), a positive input terminal (+), and an output terminal, a PMOS transistor PM, a fifth resistor R5, and a sixth transistor R6. The PMOS transistor of the voltage regulator 140 may include a gate connected to the output terminal of the comparator 142, a source connected to an output terminal of the rectifier 120, and a drain connected to output the internal voltage VDDI. The regulator converter 130 may include a first switch SW1 and a second switch SW2 that select the first voltage V1 applied to the negative input terminal (−) of the comparator 142. Additionally, the regulator converter 130 may include a third switch SW3 and a fourth switch SW4 that select the second voltage V2 applied to the positive input terminal (+) of the comparator 142. The mode selection signal Mode_SEL may have the low level when a load modulation mode is deactivated and may have the high level when the load modulation mode is activated.

When the mode selection signal Mode_SEL has the low level, i.e., the load modulation mode is deactivated, the first switch SW1 and the third switch SW3 may be turned-on, the second switch SW2, the fourth switch SW4, and the diode switch SWD may be turned-off. For example, when the load modulation mode is deactivated, the rectified voltage VDDU may be divided by the third and fourth resistors R3 and R4 of the regulator converter 130, and the divided voltage may be provided to the negative input terminal (−) of the comparator 142 through the first switch SW1 turned-on. When the load modulation mode is deactivated, the regulator converter 130 may provide the reference voltage Vref to the positive input terminal (+) of the comparator 142 through the third switch SW3. Thus, the voltage regulator 140 may have a positive feedback loop formed with the comparator 142, the PMOS transistor PM, and the third resistor R3. In other words, when the load modulation mode is deactivated, the voltage regulator 140 may operate in a normal voltage regulator mode such that the level of the rectified voltage VDDU may maintain to be constant.

On the other hand, when the mode selection signal Mode_SEL has the high level, i.e., when the load modulation mode is activated, the first switch SW1 and the third switch SW3 may be turned-off, and the second switch SW2, the fourth switch SW4, and the diode switch SWD may be turned-on. In detail, when the load modulation mode is activated, the regulator converter 130 may provide the reference voltage Vref to the negative input terminal (−) of the comparator 142, the regulator converter 130 may provide the feedback voltage Vfb to the positive input terminal (+) of the comparator 142. The feedback voltage Vfb is obtained by dividing the internal voltage VDDI of the voltage regulator 140 by fifth and sixth resistors R5 and R6. Thus, the voltage regulator 140 may have a negative feedback loop formed with the comparator 142, the PMOS transistor PM, and the third resistor R5. Therefore, the voltage regulator 140 may operate in the LDO mode such that the internal voltage VDDI may be maintained to be constant.

Additionally, when the load modulation mode is activated, the diode switch SWD may be turned-on such that a resistance of the clamp circuit 150 is changed, and a discharge current greater than a current flowing through the PMOS transistor PM of the voltage regulator 140, may flow to the ground through the diode SD. For example, when the load modulation mode is activated, as the voltage regulator 140 may operate in the LDO mode, the level of the rectified voltage VDDU may be affected by a resistance of the diode SD. However, since a turn-on resistance of the diode SD may maintain a fixed value, the level of the rectified voltage VDDU does not become unstable by the resistance change of the clamp circuit 150. Further, when the load modulation mode is activated, the diode SD may flows the discharge current greater than the current of the PMOS transistor PM, a voltage of an anode of the diode SD may become a turn-on voltage of the diode SD, which may be substantially constant. Thus, the level of the rectified voltage VDDU may be the turn-on voltage of the diode SD such that the rectified voltage VDDU is stable.

Figure 3:
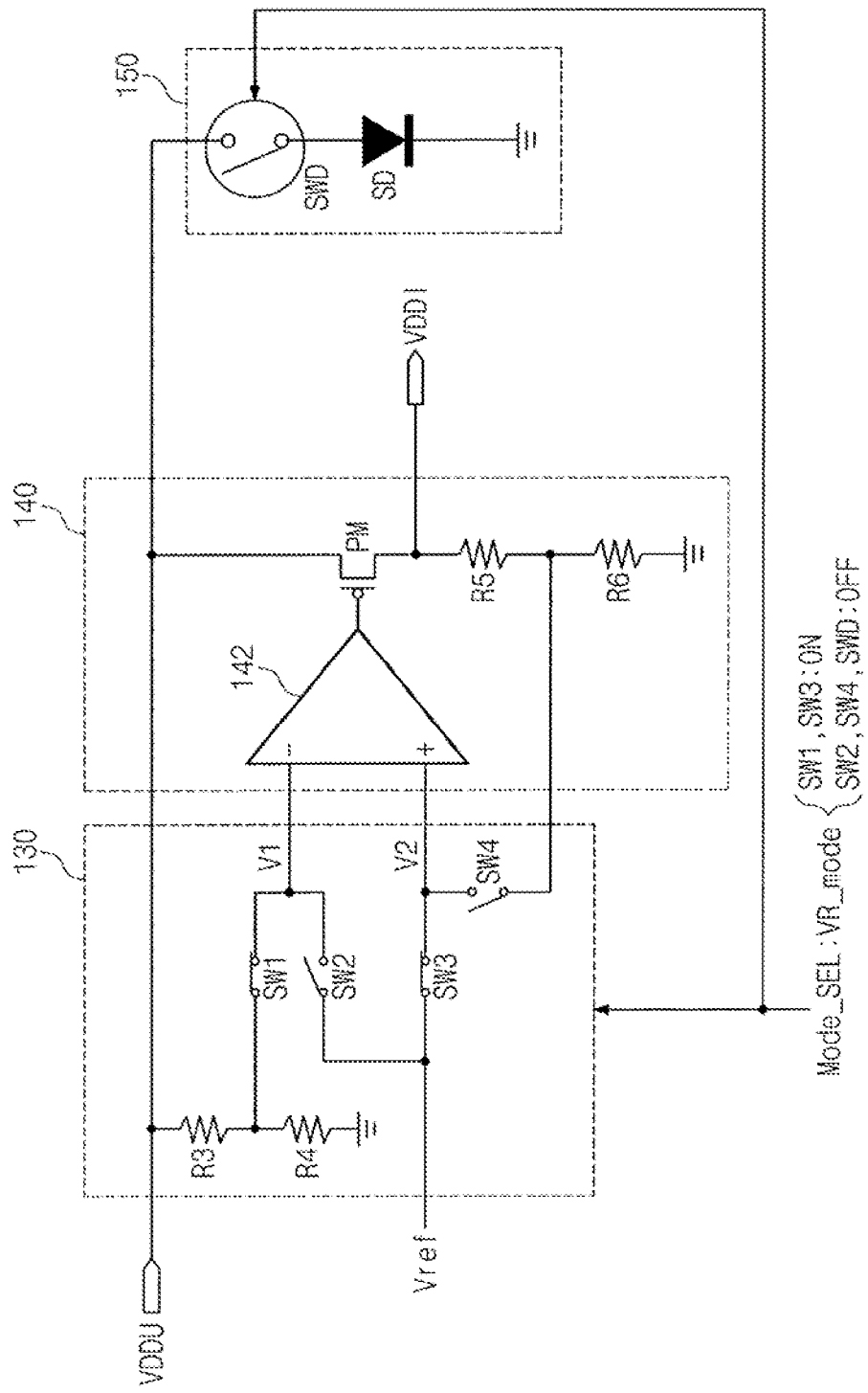
FIG. 3 illustrates a circuit diagram for describing a switching state of a regulator converter of the smart card of FIG. 1 when a load modulation mode is deactivated.

FIG. 3 is a circuit diagram illustrating a switching state of the regulator converter 130 when the load modulation mode is deactivated. Referring to FIG. 3, when the load modulation mode is deactivated, the first switch SW1 and the third switch SW3 may be turned-on, and the second switch SW2, the fourth switch SW4, and the diode switch SWD may be turned-off.

When the smart card 100 operates in the deactivated load modulation mode, the mode selection signal Mode_SEL may have the low level. For example, when the load modulation mode is deactivated or the voltage regulator 140 is operated in the normal voltage regulator mode using the divided voltage of the rectified voltage VDDU, the mode selection signal Mode_SEL may have the low level. When the mode selection signal Mode_SEL has the low level, the first switch SW1 and the third switch SW3 of the regulator converter 130 may be turned-on, and the second switch SW2, the fourth switch SW4, and the diode switch SWD of the clamp circuit 150 may be turned-off.

In the switching state of the regulator converter 130 as described above, the voltage regulator 140 may maintain the level of the rectified voltage VDDU at a value defined by the reference voltage Vref.

Figure 4:
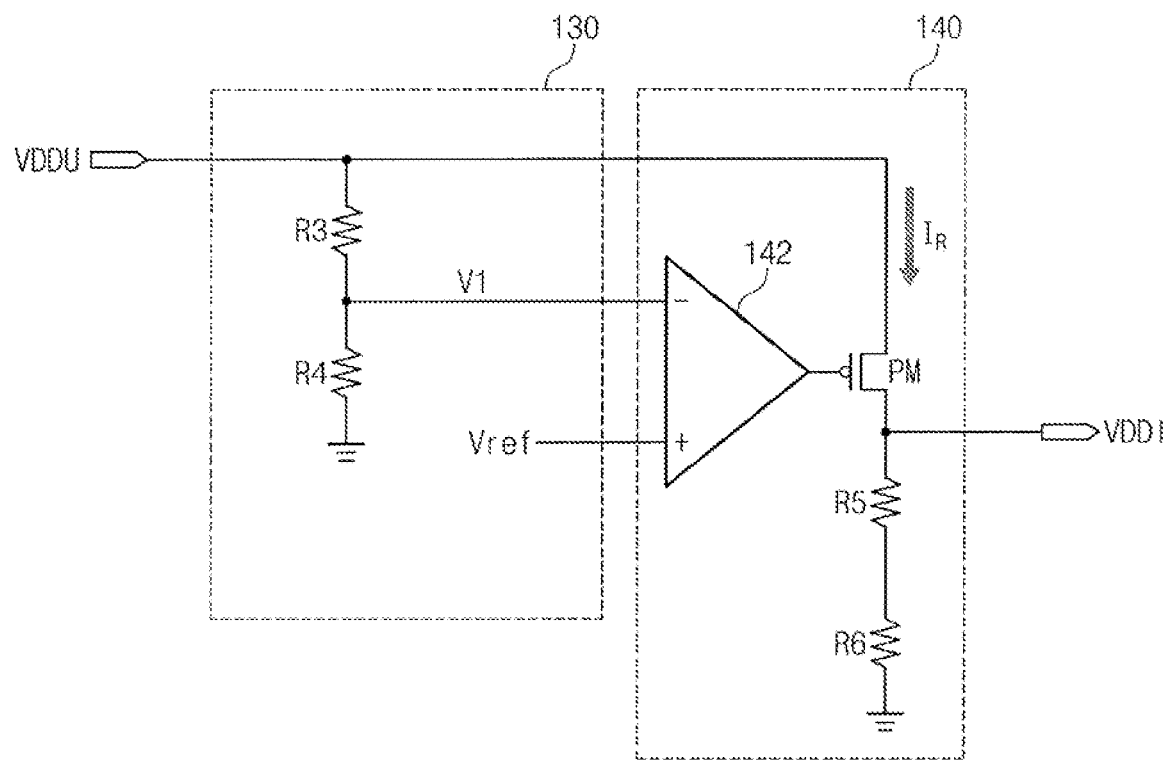
FIG. 4 illustrates a circuit diagram for describing an operation of a voltage regulator of the smart card in the switching state of the regulator converter of FIG. 3.

FIG. 4 is a circuit diagram illustrating the operation of the voltage regulator 140 in the switching state of the regulator converter 130 of FIG. 3. Referring to FIG. 4, the voltage regulator 140 may operate in the normal voltage regulator mode such that the level of the rectified voltage VDDU may be maintained to be constant.

A change of the rectified voltage VDDU may be input to the negative input terminal (−) of the comparator 142 through the first switch SW1 of the regulator converter 130. For example, when the load modulation mode is deactivated, the rectified voltage VDDU may be divided to the first voltage V1 having a lower level than the rectified voltage VDDU by the third and fourth resistors R3 and R4, and the first voltage V1 may be applied to the negative input terminal (−) of the comparator 142.

When a level of the first voltage V1 input to the negative input terminal (−) is lower than the reference voltage Vref, the comparator 142 may generate an output voltage having a high level to turn off the PMOS transistor PM. As a result, an amount of a current IR flowing to the ground through the PMOS transistor PM may decrease, and the level of the rectified voltage VDDU may increase. On the contrary, when the level of the first voltage V1 applied to the negative input terminal (−) of the comparator 142 is higher than the reference voltage Vref, the comparator 142 generates an output voltage having a low level to turn on the PMOS transistor PM. As a result, the amount of the current IR flowing in the ground through the PMOS transistor PM may increase, and the level of the rectified voltage VDDU may decrease. According to these operations, the voltage regulator 140 may maintain the level of the rectified voltage VDDU to be a constant level. The level of the rectified voltage VDDU controlled by the voltage regulator 140 may be the reference voltage Vref.

The internal voltage VDDI output from the voltage regulator 140 may be substantially changed according to a change of the current IR flowing to the ground through the PMOS transistor PM. Thus, the smart card 100 may further include an additional regulator circuit (not shown) to maintain the internal voltage VDDI at a constant level.

Figure 5:
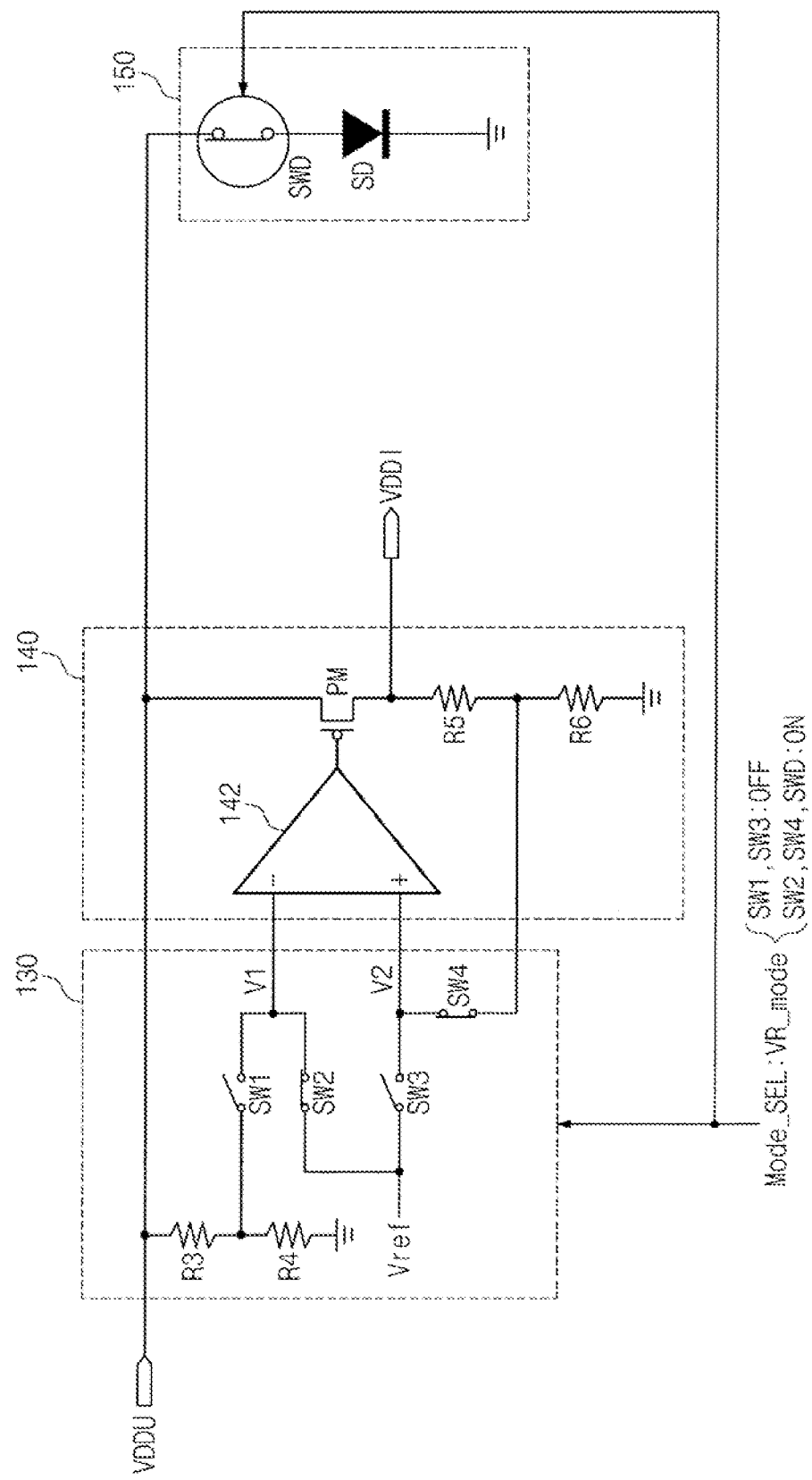
FIG. 5 illustrates a circuit diagram for describing a switching state of the regulator converter of the smart card when the load modulation mode is activated.

FIG. 5 is a circuit diagram for describing a switching state of the regulator converter 130 when the load modulation mode is activated. Referring to FIG. 5, when the load modulation mode is activated, the first switch SW1 and the third switch SW3 may be turned-off, and the second switch SW2, the fourth switch SW4, and the diode switch SWD may be turned-on.

When the load modulation mode is activated to transmit the transmission data TX_DATA to the card reader through the antenna 110 of the smart card 100, the load modulator 160 may provide the transmission signal TX to the variable resistor VR and the regulator controller 170. The regulator controller 170 may provide the mode selection signal Mode_SEL having the high level to the regulator converter 130. The first switch SW1 and the third switch SW3 may be turned-off in response to the mode selection signal Mode_SEL having the high level and the second switch SW2, the fourth switch SW4, and the diode switch SWD may be turned-on in response to the mode selection signal Mode_SEL having the high level.

Figure 6:
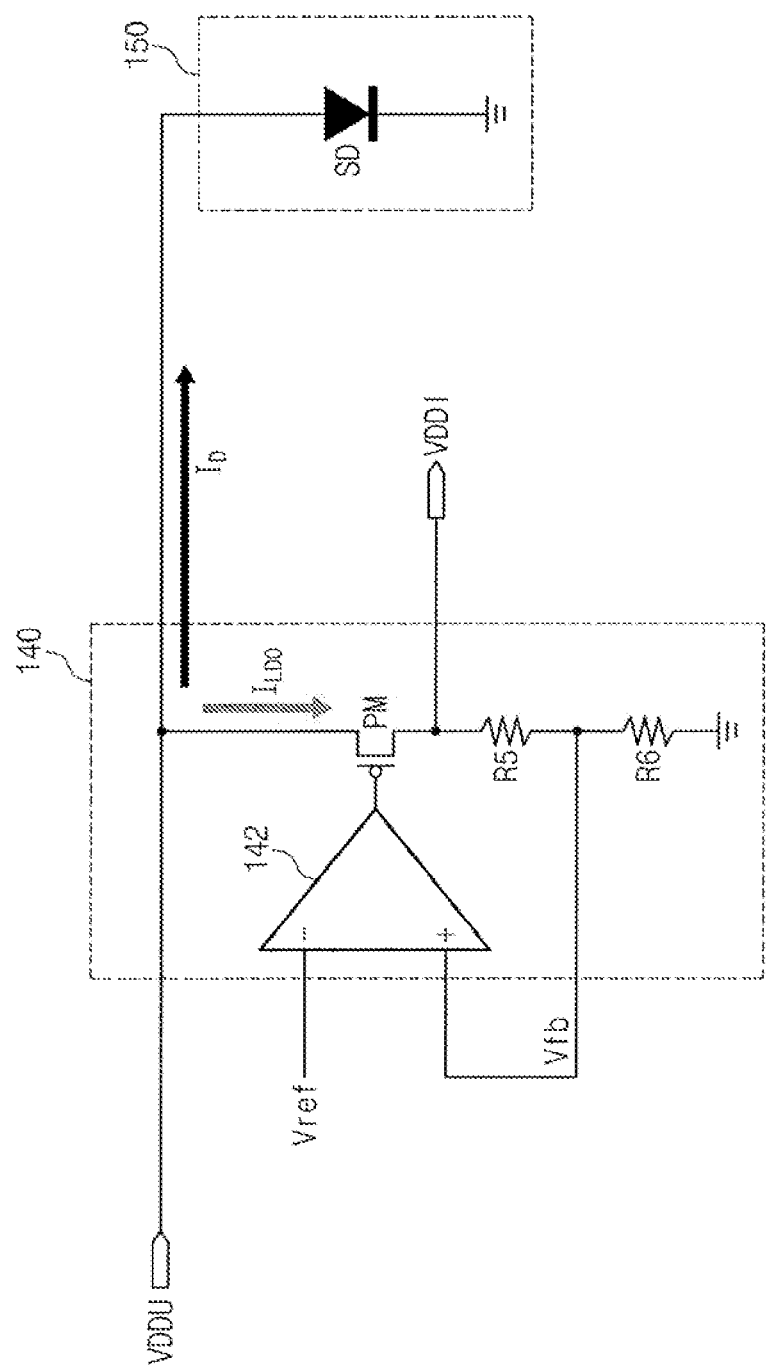
FIG. 6 illustrates a circuit diagram for describing an operation of the voltage regulator of the smart card in the switching state of the regulator converter of the smart card of FIG. 5.

FIG. 6 is a circuit diagram for describing the operation of the voltage regulator 140 in the switching state of the regulator converter 130 of FIG. 5. Referring to FIG. 6, the rectified voltage VDDU may be supplied to an anode of the diode SD through the diode switch SWD being turned-on, a cathode of the diode SD may be connected to the ground, and the voltage regulator 140 may operate in the LDO mode.

The reference voltage Vref may be input to the negative input terminal (−) of the comparator 142 by the regulator converter 130. The feedback voltage Vfb of the internal voltage VDDI may be input to the positive input terminal (+) of the comparator 142. The internal voltage VDDI as an output voltage of the voltage regulator 140 may be voltage-divided by the fifth and sixth resistors R5 and R6. The divided voltage of the internal voltage VDDI as the feedback voltage Vfb may be applied to the positive input terminal (+) of the comparator 142.

When a level of the feedback voltage Vfb input to the positive input terminal (+) of the comparator 142 is lower than the reference voltage Vref, the comparator 142 generates an output voltage having the low level to turn on the PMOS transistor PM. Thus, an amount of a current $I_{LDO}$ flowing to the ground through the PMOS transistor PM may increase, and the level of the internal voltage VDDI may increase.

On the contrary, when the level of the feedback voltage Vfb input to the positive input terminal (+) of the comparator 142 is higher than the reference voltage Vref, the comparator 142 generates an output voltage having the high level to turn off the PMOS transistor PM. Thus, the amount of the current $I_{LDO}$ flowing to the ground through the PMOS transistor PM may decrease, and the level of the internal voltage VDDI may decrease.

The rectified voltage VDDU may be connected to the anode of the diode SD, and the cathode of the diode SD may be connected to the ground. A current capacity of the diode SD is larger than a current capacity of the PMOS transistor PM. Thus, an amount of the current ID flowing to the ground through the diode SD is larger than the amount of the current $I_{LDO}$ flowing to the ground through the PMOS transistor PM. Further, when the diode SD flows the current ID, the diode SD may operate in a forward bias region, and a voltage difference between the anode and the cathode of the diode SD may be substantially constant (e.g., about 0.7V). As a result, the voltage difference between the anode and the cathode of the diode SD may correspond to the voltage level of the rectified voltage VDDU such that the level change of the rectified voltage VDDU due to a change of the current Iwo flowing through the PMOS transistor PM may be removed and prevented.

Figure 7A:
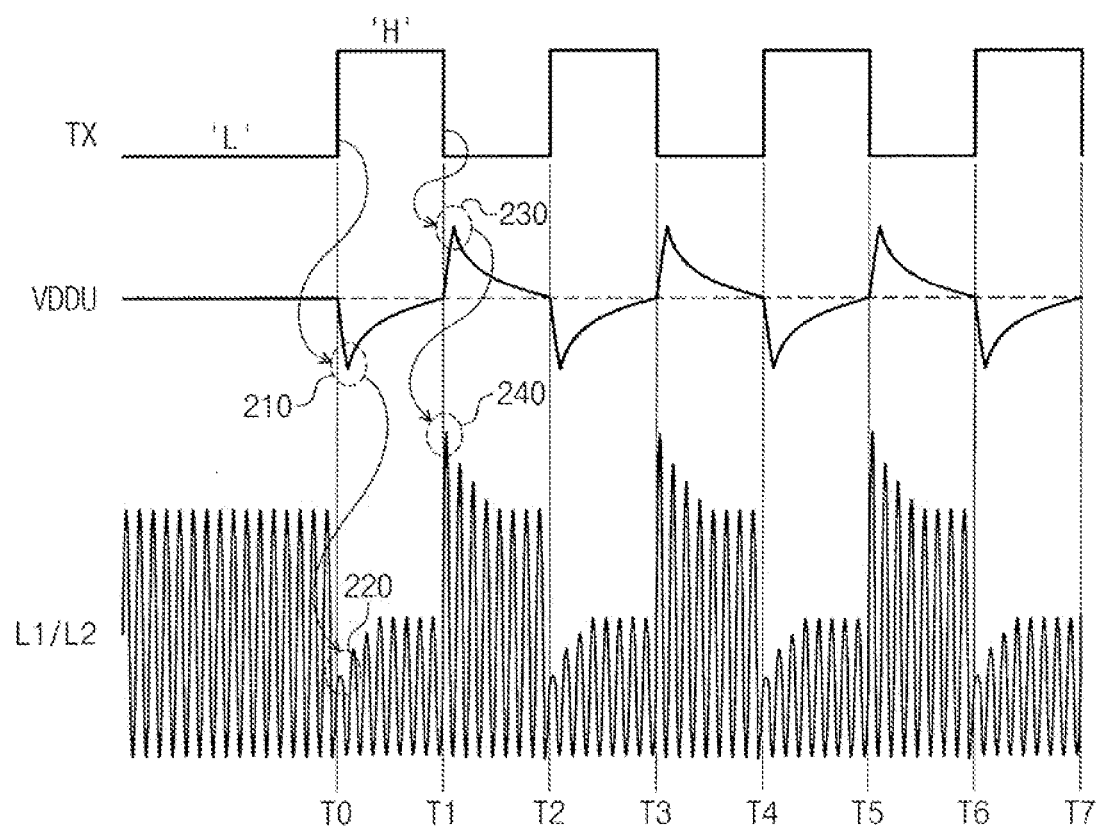
FIGS. 7A and 7B illustrate timing diagrams for describing operation modes of the smart card of FIG. 1 and effects according to the operation modes of the smart card.
Figure 7B:
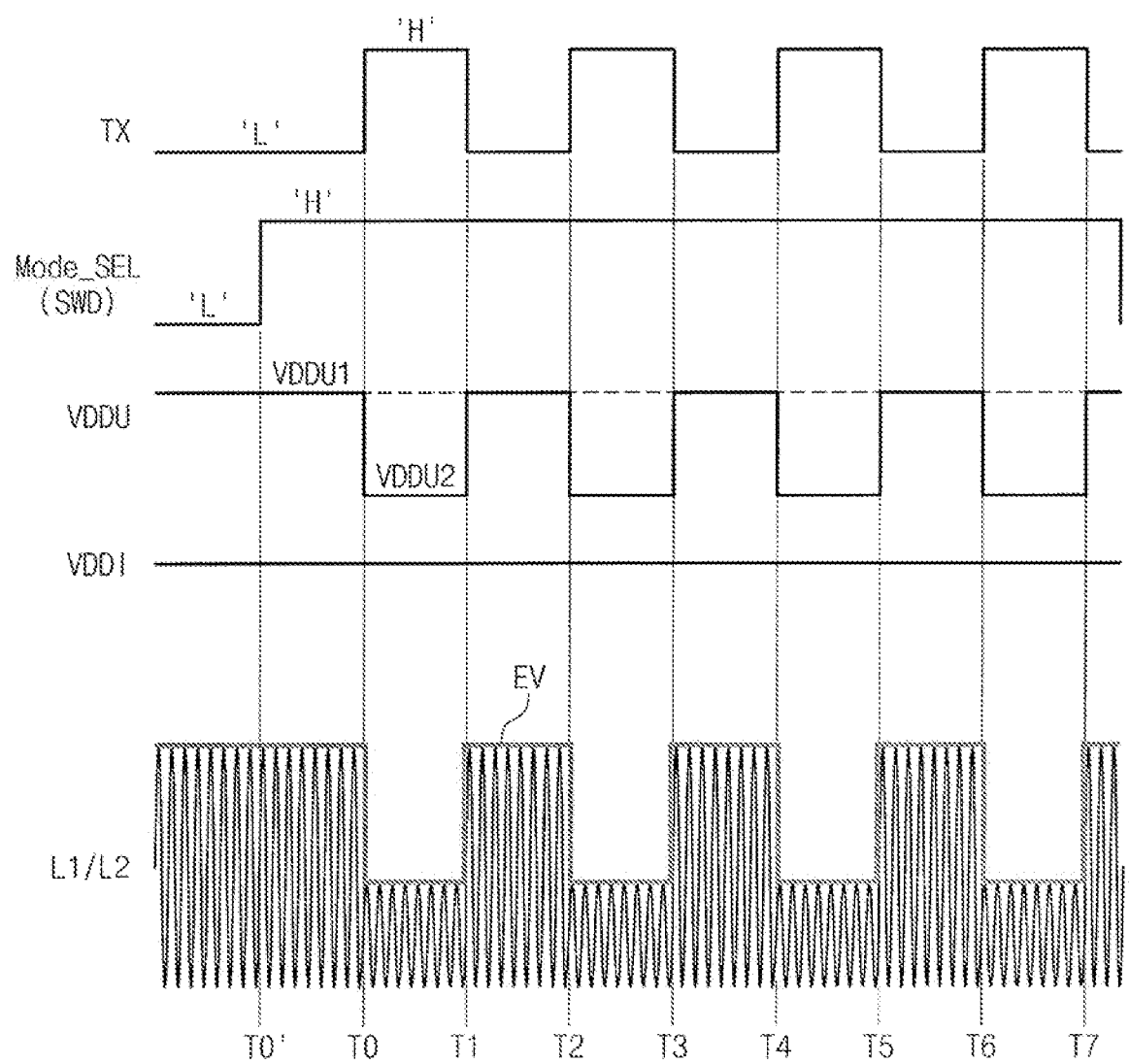

FIGS. 7A and 7B are timing diagrams for describing operation modes of the voltage regulator 140 and effects according to the operation modes of the voltage regulator 140. FIG. 7A illustrates a load modulation waveform L1/L2 at the both ends of the antenna 110 when the load modulation operates and the voltage regulator 140 does not change the operation modes thereof. FIG. 7B is a view illustrating a load modulation waveform L1/L2 at the both ends of the antenna 110 when the load modulation operates and the voltage regulator 140 may change the operation modes thereof.

Referring to FIG. 7A, the rectified voltage VDDU may be changed or fluctuated by the operation of the voltage regulator 140 for maintaining the rectified voltage VDDU at a constant level such that the load modulation waveform L1/L2 at the both ends L1 and L2 of the rectifier 120 may have a peak.

The modulation switch SW0 may periodically be turned-on and turned-off to perform the load modulation from a first time point T0 according to the transmission signal TX. For example, when the transmission signal TX transits from a low level L to a high level H, a resistance of the variable resistor VR may change by the switching operation of the modulation switch SWO. For example, when the transmission signal TX is the low level L, the modulation switch SW0 may be turned-off, and both terminals of the variable resistor VR may be disconnected from each other such that the load modulation waveform L1/L2 may not be influenced by the variable resister VR. Further, when the transmission signal TX is the high level H, the modulation switch SW0 may be turned-on, and the variable resistor VR may have a sum resistance of the first and second resistors R1 and R2 such that a level of the load modulation waveform L1/L2 may be decreased by the variable resistor VR. Further, when the transmission signal TX transits from the low level L to the high level H, the level of the rectified voltage VDDU may be temporarily decreased by the change of the resistance of the variable resistor VR. For example, as the resistance of the variable resistor VR is decreased, the rectified voltage VDDU may be rapidly decreased such that the rectified voltage VDDU may have an undershoot 210. The load modulation waveform L1/L2 at the both ends of the antenna 110 may have a peak 220 that rapidly decreases at the first time point T0 due to the undershoot 210 of the rectified voltage VDDU. The peak values of the load modulation waveform L1/L2 may change according to the level of the rectified voltage VDDU and may not have the same peak level from the first time point T0 to a second point T1. For example, the peak value of the load modulation waveform L1/L2 at the first time point T0 at the may be the smallest among the other peak values of the load modulation waveform L1/L2 between the first and second time points T0 and T1. Thus, the changed peak values of the load modulation waveform L1/L2 may cause the distortion and the noise of the load modulation waveform L1/L2 such that the transmission data TX_DATA may be transmitted to the card reader with errors.

The distortion of the load modulation waveform L1/L2 also may occur at a second time point T1 when the the transmission signal TX transits from the high level H to the low level L. For example, the rectified voltage VDDU may be rapidly increased as the resistance of the variable resistor VR is increased. At that time, the rectified voltage VDDU may have the overshoot 230. The load modulation waveform L1/L2 may have a peak 240 that rapidly increases at the second time point T1 due to the overshoot 230 of the rectified voltage VDDU. The peak values of the load modulation waveform L1/L2 may change as the level of the rectified voltage VDDU from the first time point T0 to the second time point T1. For example, the peak value of the load modulation waveform L1/L2 at the second time point T1 may be the greatest among the other peak values of the load modulation waveform L1/L2 between the second and third time points T1 and T2. Thus, the changed peak values of the load modulation waveform L1/L2 may cause the distortion and the noise of the load modulation waveform L1/L2 such that the transmission data TX_DATA may be transmitted to the card reader with errors.

The distortion of the load modulation waveform L1/L2 is caused by the operation of the voltage regulator 140 for maintaining the rectified voltage VDDU to be constant. In an embodiment, since the operation mode of the voltage regulator 140 may operate in the first and second regulator modes using the regulator converter 130 and the clamp circuit 150, the distortion of the load modulation may be removed and prevented.

FIG. 7B is a timing diagram illustrating the load modulation waveform L1/L2 according to the first and second regulator modes of the voltage regulator 140. Referring to FIG. 7B, the operation mode of voltage regulator 140 is changed from the first regulator mode to the second regulator mode by the mode selection signal Mode_SEL before the load modulation is started. Although the rectified voltage VDDU may be varied by the load modulation, the internal voltage VDDI of the voltage regulator 140 may be maintained to be constant. Therefore, the distortion of the load modulation waveform L1/L2 may be removed and prevented.

The mode selection signal Mode_SEL may transit from the low level L to the high level H at a previous time point T0' before the load modulation is started. For example, the regulator controller 170 may receive a signal for activating the load modulation from the load modulator 160 and may generate the mode selection signal Mode_SEL. In some implementations, the regulator controller 170 may receive the transmission signal TX from the load modulator 160 and may generate the mode selection signal Mode_SEL. When the mode selection signal Mode_SEL may transit from the low level L to the high level H, the operation mode of the voltage regulator 140 is changed to the second regulator mode, i.e., to the LDO mode, and the diode SD may flow the discharge current from the rectified voltage VDDU to the ground. For example, the anode of the diode SD may be connected to the output terminal of the rectifier 120 supplying the rectified voltage VDDU, and the the cathode of the diode SD may be connected to the ground.

When the modulation switch SW0 is turned-on at the first time point T0 according to the mode selection signal Mode_SEL, the resistance of the variable resistor VR may change. Thus, the level of the rectified voltage VDDU may decrease from a first rectified voltage VDDU1 to a second rectified voltage VDDU2. That it, at that time, the voltage regulator 140 may not operate in the normal voltage regulator mode for maintaining the rectified voltage VDDU to be constant, and the voltage regulator 140 may operate in the LDO mode for maintaining the internal voltage VDDI to be constant. Additionally, when the modulation switch SW0 is turned-on, the discharge current flowing through the diode SD is great such that an amount of a current flowing through the voltage regulator 140 may decrease. Thus, the rectified voltage VDDU may have a square wave form without any glitch, e.g., undershoot or overshoot, in synchronization with a state of the modulation switch SW0. As a result, the distortion of an envelope EV of the load modulation waveform L1/L2 at the both ends of the antenna 110 may be removed and prevented.

Figure 8:
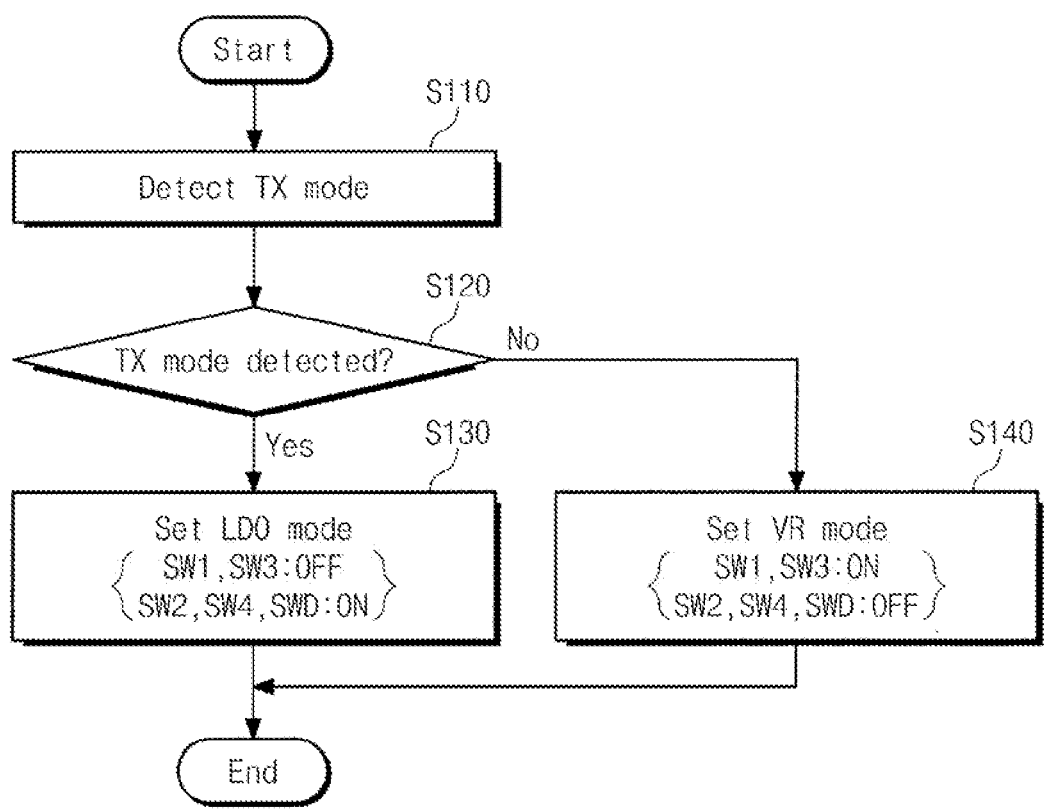
FIG. 8 illustrates a flowchart for describing an operation of the regulator controller of the smart card of FIG. 1.

FIG. 8 is a flowchart for describing an operation of the regulator controller 170 of FIG. 1. Referring to FIG. 8, the regulator controller 170 may detect a transmission mode TX mode transmitted from the load modulator 160 to determine the operation mode of the voltage regulator 140.

In operation S110, the regulator controller 170 may receive the transmission mode TX mode or the transmission signal TX transmitted from the load modulator 160. For example, when the transmission data TX_DATA is input to the load modulator 160, the load modulator 160 may generate the transmission signal TX to control the modulation switch SW0. The load modulator 160 may provide the transmission mode TX mode to the regulator controller 170 before generating the transmission signal TX.

In operation S120, the regulator controller 170 may perform an operation for detecting the transmission mode TX mode. When the transmission mode TX mode is detected, the process may proceed to operation S130 in 'Yes' direction. On the other hand, when the transmission mode TX mode is not detected, the process may proceed to operation S140 in 'No' direction.

In operation S130, the regulator controller 170 may control the regulator converter 130 and the clamp circuit 150 so that the voltage regulator 140 may operate in the LDO mode, i.e., in the second regulator mode. For example, the regulator controller 170 may output the mode selection signal Mode_SEL having the high level H to turn off the first and third switches SW1 and SW3. Additionally, the regulator controller 170 may output the mode selection signal Mode_SEL having the high level H to turn on the second and fourth switches SW2 and SW4 and the diode switch SWD of the clamp circuit 150. Thus, the regulator controller 170 may stop regulating on the rectified voltage VDDU and may operate in the LDO mode to maintain the internal voltage VDDI to be constant.

In operation S140, the regulator controller 170 may control the regulator converter 130 and the clamp circuit 150 so that the voltage regulator 140 operates in the first regulator mode. For example, the regulator controller 170 may output the mode selection signal Mode_SEL having the low level L to turn on the first and third switches SW1 and SW3. Additionally, the regulator controller 170 may output the mode selection signal Mode_SEL having the low level L to turn off the second and fourth switches SW2 and SW4 and the diode switch SWD of the clamp circuit 150. Thus, the regulator controller 170 may operate in the first regulator mode to maintain the rectified voltage VDDU to be constant.

In the above, a changing method of the operation mode of the regulator converter 130 and the clamp circuit 150 with reference to the transmission mode TX mode provided from the load modulator 160 has been described.

Figure 9A:
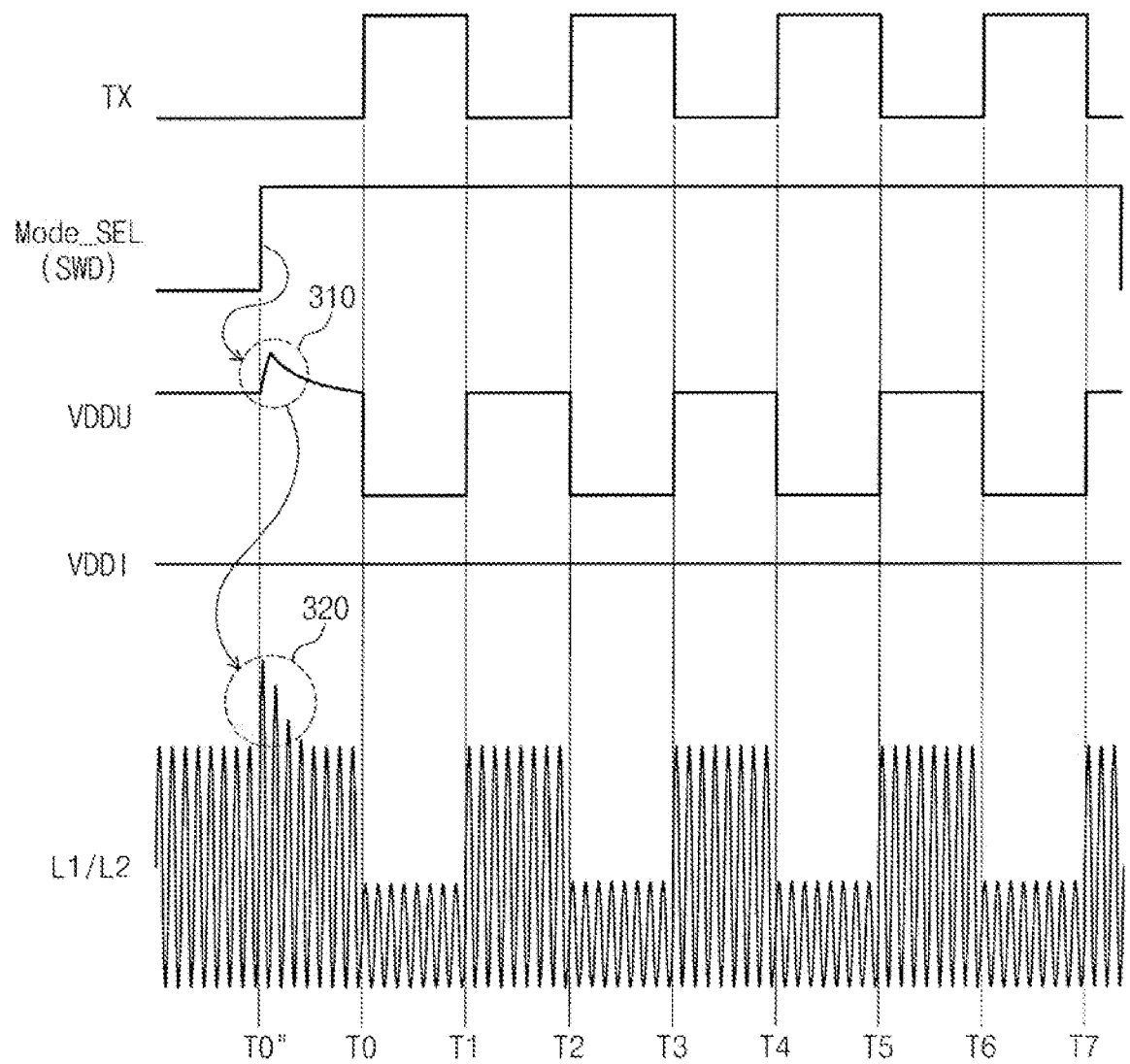
FIGS. 9A and 9B illustrate examples of timing diagrams of another embodiment.
Figure 9B:
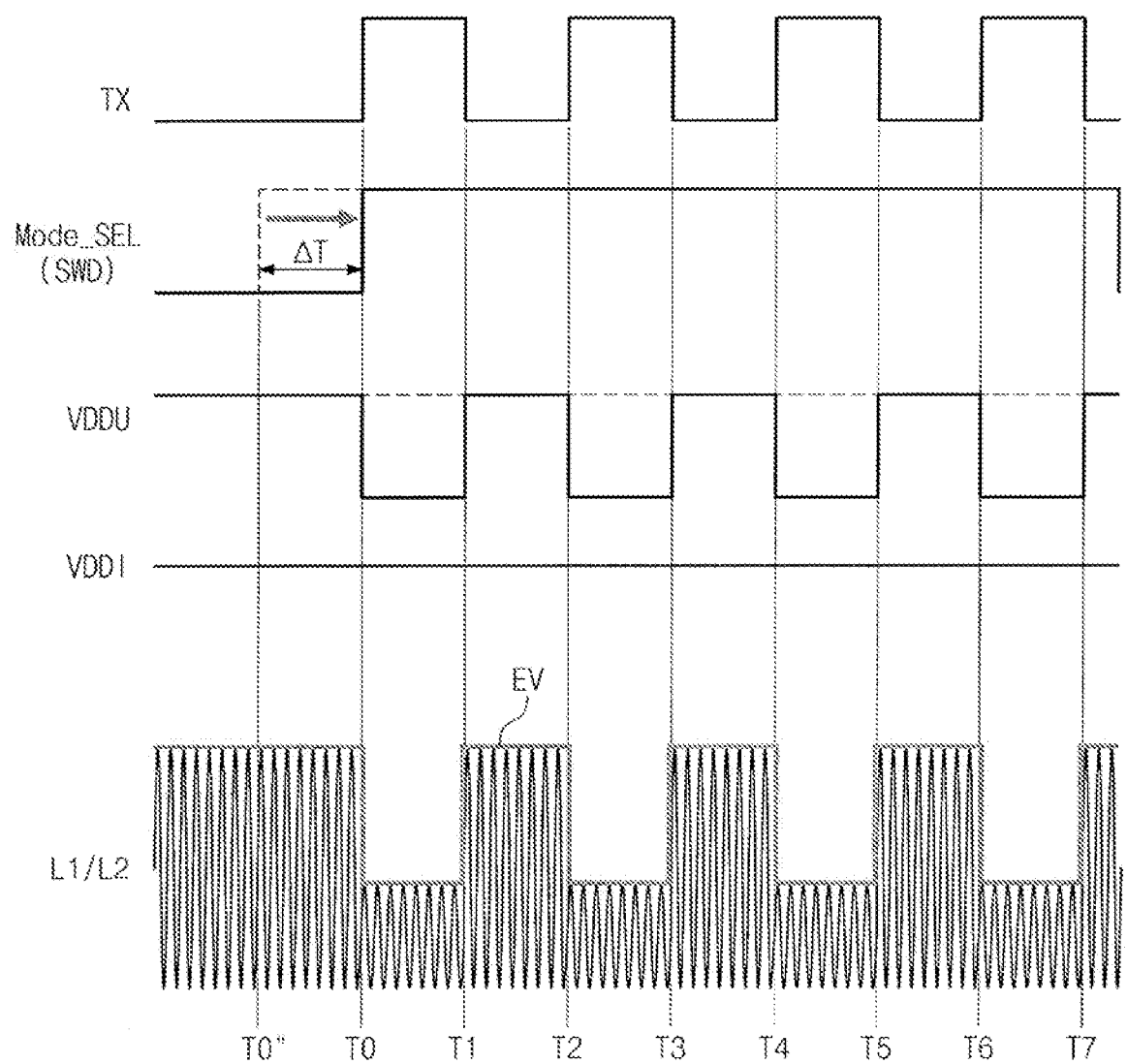

FIGS. 9A and 9B are examples of timing diagrams of another embodiment. FIG. 9A is a timing diagram for describing a glitch generated by the mode change of the voltage regulator 140 by the regulator converter 130. FIG. 9B is a timing diagram for describing a method to solve the glitch generated by the mode change of the voltage regulator 140.

Referring to FIG. 9A, the glitch 320 may be generated when the operation mode of the voltage regulator 140 is changed from the first regulator mode to the second regulator mode, i.e., the LDO mode.

At a previous time point T0", when the transmission mode TX mode is detected, the regulator controller 170 may transit the mode selection signal Mode_SEL to the high level H. Thus, the first and third switches SW1 and SW3 may be turned-off, and the second and fourth switches SW2 and SW4 and the diode switch SWD of the clamp circuit 150 may be turned-on. A switching shock may be generated by the turning-on operation of the diode switch SWD and an exchange of input and output values of the comparator 142 such that the rectified voltage VDDU may have an overshoot 310. Alternatively, at that time, the rectified voltage VDDU may have an undershoot.

Consequently, the glitch 320 may be generated in the load modulation waveform L1/L2 at the previous time point T0" by the overshoot 310 of the rectified voltage VDDU. Thus, an adjustment of timing of the mode selection signal Mode_SEL is required to remove the glitch 320 caused by the switching operations of the voltage regulator 140.

FIG. 9B is a timing diagram for describing a switching method according to another embodiment. Referring to FIG. 9, a transition point of the mode selection signal Mode_SEL may be synchronized with a start point of the load modulation so that a switching shock due to the load modulation and an influence due to the mode change of the voltage regulator 140 may be offset and compensated.

The regulator controller 170 may receive the transmission signal TX from the load modulator 160 to determine the start point of the load modulation. The regulator controller 170 may change the level of the mode selection signal Mode_SEL at a first time point T0 at which a transition of the modulation switch SW0 is started. For example, the regulator controller 170 may transit the level of the mode selection signal Mode_SEL in synchronization with at the first time point T0 at which the load modulation is started. Thus, the mode selection signal Mode_SEL may be activated at the first time point T0, i.e., at a time point delayed by a time period ΔT from the start point of the mode selection signal Mode_SEL in FIG. 9A.

when the modulation switch SW0 is turned-on, the load modulation and the mode change of the voltage regulator 140 are simultaneously performed. Thus, the switching shock due to the mode change of the voltage regulator 140 and the switching shock due to the load modulation may be offset and compensated. As a result, rectified voltage VDDU may not have any overshoot or undershoot, and the envelope EV of the load modulation waveform L1/L2 may have a square wave without any glitch.

Figure 10:
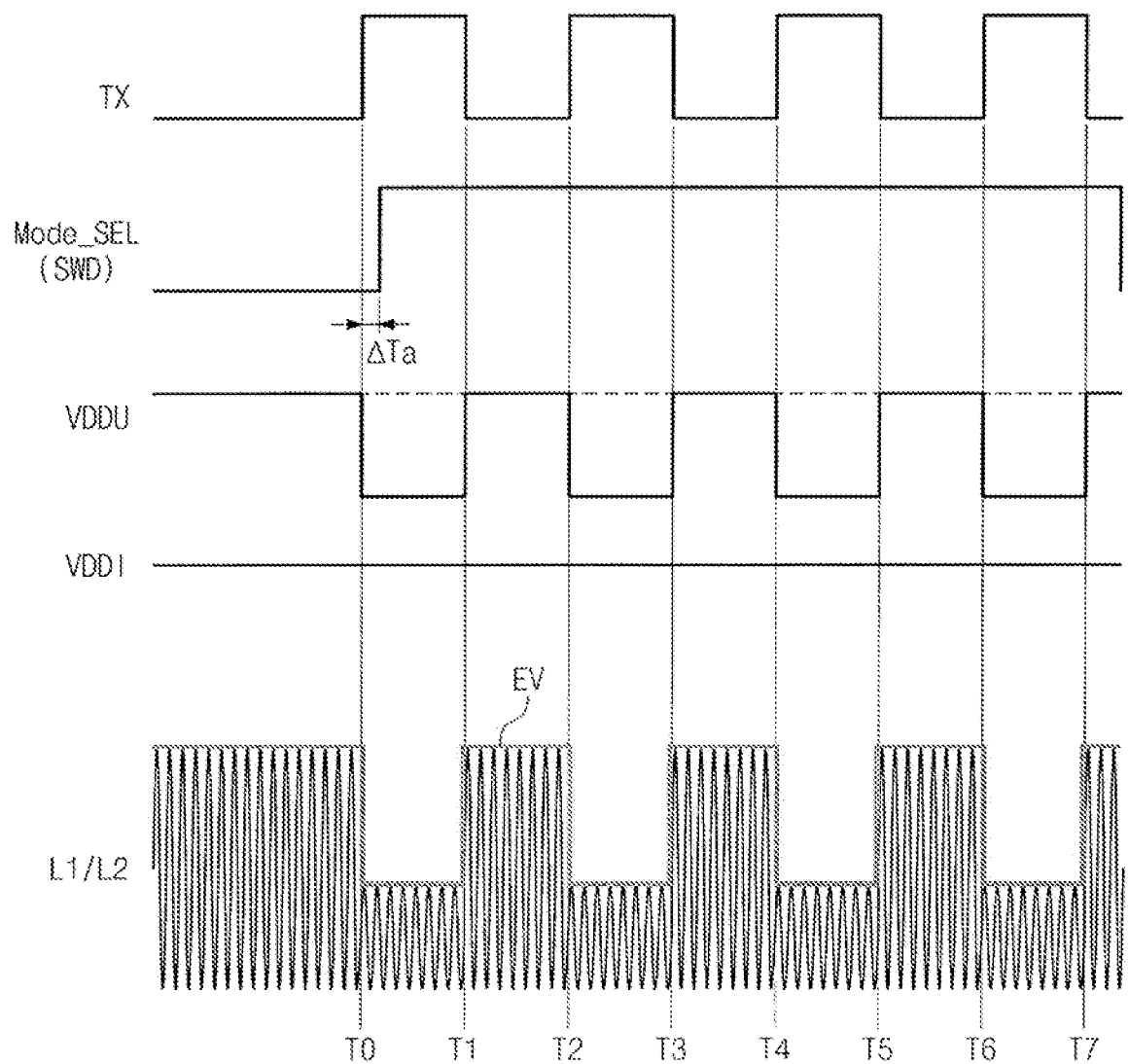
FIG. 10 illustrates an example of a timing diagram of an embodiment.

FIG. 10 is a timing diagram for describing a switching method according to an embodiment. Referring to FIG. 10, the transition point of the mode selection signal Mode_SEL and the start point of the load modulation in FIG. 9B may be adjusted to further improve the load modulation waveform L1/L2.

The regulator controller 170 may receive the transmission signal TX from the load modulator 160 to determine the start point of the load modulation. The regulator controller 170 may change the level of the mode selection signal Mode_SEL at a time point delayed by a predetermined time ΔTa from the first time point T0 at which the transition of the modulation switch SW0 is started. For example, the regulator controller 170 may transit the level of the mode selection signal Mode_SEL after the predetermined time ΔTa from the first time point T0 at which the load modulation is started.

The predetermined time ΔTa may correspond to a delay time of the mode change of the voltage regulator 140, a delay time of a connection of the rectified voltage VDDU and the ground through the diode SD may occur, or a delay time of the discharge current flowing through diode SD from the rectified voltage VDDU to the ground. The predetermined time ΔTa may be set at a time point at which a noise due to the mode change of the voltage regulator 140 and the transition of the modulation switch SW0 may be minimized through experiments.

Figure 11:
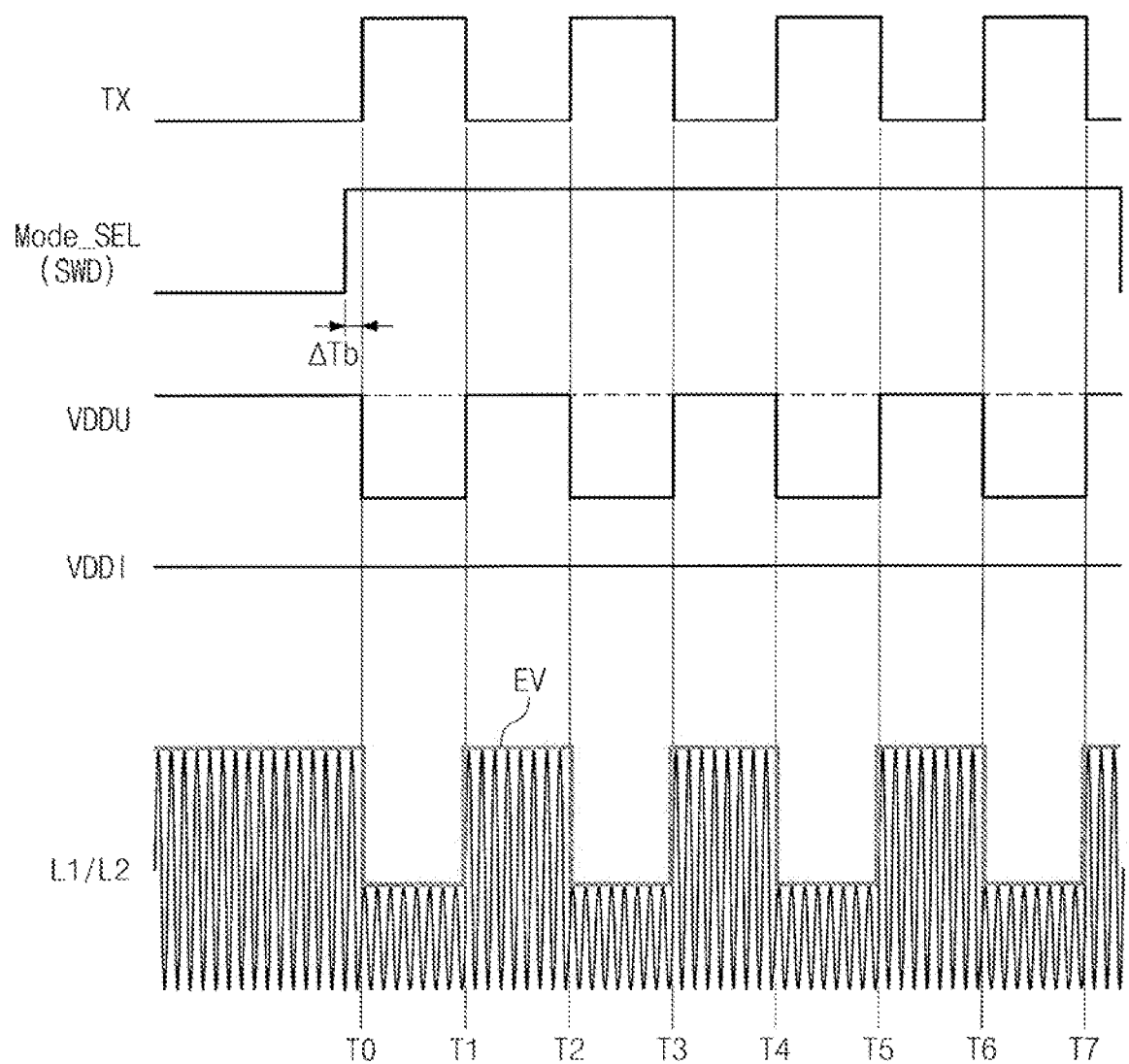
FIG. 11 illustrates an example of a timing diagram of another embodiment.

FIG. 11 is a timing diagram for describing a switching method of another embodiment. Referring to FIG. 11, the transition point of the mode selection signal Mode_SEL and the start point of the load modulation in FIG. 9B may be adjusted to further improve the load modulation waveform L1/L2.

The regulator controller 170 may receive the transmission signal TX from the load modulator 160 to determine the start point of the load modulation. The regulator controller 170 may change the level of the mode selection signal Mode_SEL at a time point earlier by a predetermined time ΔTb than the first time point T0 at which the transition of the modulation switch SW0 is started. For example, the regulator controller 170 may transit the level of the mode selection signal Mode_SEL at the time point earlier by the predetermined time ΔTb than the first time point T0 at which the load modulation is started.

When the switching of the modulation switch SW0 according to the load modulation occurs at the first time point T0, the mode change of the voltage regulator 140 and a connection of the rectified voltage VDDU and the ground through the diode SD may occur at the time point earlier by the predetermined time ΔTb than the first time point T0. The predetermined time ΔTb may be set at a time point at which a noise due to the mode change and the transition of the modulation switch SW0 is minimized through experiments.

Figure 12:
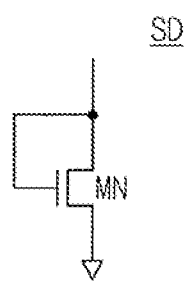
FIG. 12 illustrates a diode of a clamp circuit of the smart card according to an embodiment.

FIG. 12 is a view showing a diode of the clamp circuit 150 according to an embodiment. Referring to FIG. 12, the diode SD may be a diode-connected NMOS transistor MN that may be implemented through a semiconductor process for forming the smart card 100. A current capacity of the diode-connected NMOS transistor MN may be set to a value greater than a current capacity of the PMOS transistor PM of the voltage regulator 140.

Figure 13:
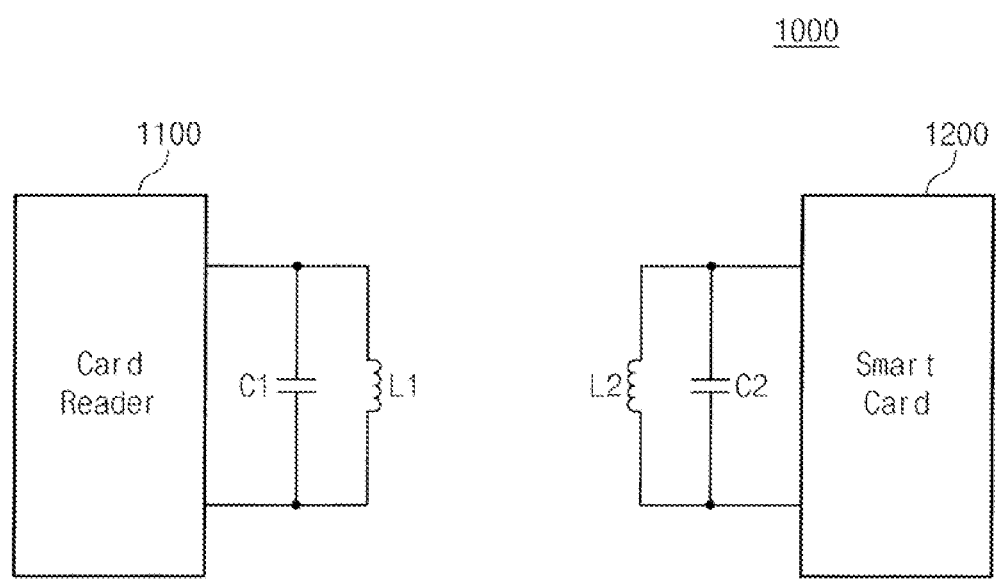
FIG. 13 illustrates a block diagram of a smart card system according to an embodiment.

FIG. 13 is a block diagram illustrating a smart card system according to an embodiment. Referring to FIG. 13, the smart card system 1000 may include a card reader 1100 and a smart card 1200. The smart card 1200 may include the regulator converter 130, the voltage regulator 140, and the clamp circuit 150 of FIG. 1. Thus, the distortion of the load modulation waveform L1/L2 generated by the stabilization operation of the rectified voltage VDDU may be prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A smart card, comprising:
an antenna configured to transmit and receive a radio frequency signal;
a rectifier configured to rectify a signal received through the antenna, and to output a rectified voltage;
a voltage regulator configured to stabilize a level of the rectified voltage;
a regulator converter including a switch configured to provide a voltage based on the rectified voltage to the voltage regulator;
a load modulator configured to vary a resistance of the antenna to perform a load modulation; and
a clamp circuit configured to connect an output terminal of the rectifier to a ground according to whether the load modulator is activated or deactivated.

2. The smart card as claimed in claim 1, wherein the voltage regulator is configured to operate in a first operation mode and a second operation mode.

3. The smart card as claimed in claim 2, wherein:
in the first operation mode, the rectified voltage maintains a constant voltage, and
in the second operation mode, an internal voltage is stabilized.

4. The smart card as claimed in claim 2, wherein:
the voltage regulator operates in the second operation mode when the load modulator is activated, and
the output terminal of the rectifier is connected to the ground through the clamp circuit when the load modulator is activated.

5. The smart card as claimed in claim 2, wherein the voltage regulator operates in the first operation mode when the load modulator is deactivated.

6. The smart card as claimed in claim 2, wherein the first operation mode is a voltage regulator mode, and the second operation mode is an LDO mode.

7. The smart card as claimed in claim 1, wherein the output terminal of the rectifier is disconnected from the ground by turning off a switch of the clamp circuit when the load modulator is deactivated.

8. The smart card as claimed in claim 1, wherein the voltage regulator includes:
a comparator having a negative input terminal and a positive input terminal; and
a transistor configured to determine whether the rectified voltage of the output terminal of the rectifier is used as an internal output voltage of the voltage regulator according to an output of the comparator.

9. The smart card as claimed in claim 8, wherein the regulator converter includes:
a first switch configured to provide a divided voltage, obtained by dividing the rectified voltage, to the negative input terminal;
a second switch configured to provide a reference voltage to the negative input terminal;
a third switch configured to provide the reference voltage to the positive input terminal; and
a fourth switch configured to provide a feedback voltage of an internal voltage to the positive input terminal.

10. The smart card as claimed in claim 9, wherein, when the load modulator is activated:
the first switch and the third switch are turned-off, and the second switch and the fourth switch are turned-on.

11. The smart card as claimed in claim 10, wherein, when the load modulator is deactivated:
the first switch and the third switch are turned-on, and the second switch and the fourth switch are turned-off.

12. A smart card, comprising:
an antenna configured to transmit and receive a radio frequency signal;
a rectifier configured to rectify an AC voltage received from the antenna, and to output a rectified AC voltage;
a voltage regulator including an input terminal connected to an output terminal of the rectifier through a first switch;
a load modulator configured to vary a resistance of the antenna to perform a load modulation; and
a clamp circuit configured to connect an output terminal of the rectifier to a ground through a second switch,
wherein the first switch is turned off and the second switch is turned on when the load modulator is activated.

13. The smart card as claimed in claim 12, wherein the first switch is turned on and the second switch is turned off when the load modulator is deactivated.

14. The smart card as claimed in claim 12, wherein the voltage regulator includes:
   a comparator configured to compare signals input to a negative input terminal and a positive input terminal thereof;
   a PMOS transistor, a gate of the PMOS transistor being connected to an output of the comparator, a source of the PMOS transistor being connected to the output terminal of the rectifier, and a drain of the PMOS transistor to output an internal voltage; and
   a regulator converter configured to select the signals input to the negative input terminal and the positive input terminal of the comparator according to whether the load modulation is activated or deactivated.

15. The smart card as claimed in claim 14, wherein, when the load modulation is activated:
   the regulator converter provides a reference voltage to the negative input terminal, and provides a feedback voltage, obtained by dividing the internal voltage, to the positive input terminal.

16. The smart card as claimed in claim 15, wherein, when the load modulation is deactivated:
   the regulator converter provides a divided voltage, obtained by dividing the rectified AC voltage, to the negative input terminal, and provides the reference voltage to the positive input terminal.

17. The smart card as claimed in claim 14, wherein:
   the clamp circuit includes a diode connected to the second switch in series between the output terminal of the rectifier and the ground, and
   the second switch is a diode switch, a first terminal of the diode switch being connected to the output terminal of the rectifier, the diode switch being configured to switch the rectified AC voltage to a second terminal of the diode switch according to whether the load modulation is activated or deactivated.

18. The smart card as claimed in claim 17, wherein a current capacity of the diode is greater than a current capacity of the PMOS transistor.

19. The smart card as claimed in claim 17, wherein a time point of operation of the first switch and the second switch is synchronized with a time point at which the resistance of the antenna is changed by the load modulation.

20. The smart card as claimed in claim 12, wherein a time point of operation of the first switch and the second switch is delayed by a predetermined time from a time point at which the resistance of the antenna is changed by the load modulation.

* * * * *